United States Patent [19]

Broderick

[11] Patent Number: 5,995,829

[45] Date of Patent: Nov. 30, 1999

[54] PROGRAMMABLE SYSTEM DETERMINATION IN DUAL-MODE WIRELESS COMMUNICATIONS SYSTEMS

[75] Inventor: Sean M. Broderick, San Diego, Calif.

[73] Assignee: Nokia Mobile Phones, Espoo, Finland

[21] Appl. No.: 08/888,191

[22] Filed: Jul. 3, 1997

[51] Int. Cl.[6] .................................................. H04M 3/00
[52] U.S. Cl. ......................... 455/418; 455/419; 455/434; 455/553
[58] Field of Search .................................... 455/418, 419, 455/420, 422, 462, 553, 574, 552, 550, 434, 515; 370/342, 441, 320, 335

[56] References Cited

U.S. PATENT DOCUMENTS

| | | |
|---|---|---|
| 4,449,248 | 5/1984 | Leslie et al. ............................... 445/38 |
| 4,993,067 | 2/1991 | Leopold ..................................... 380/21 |
| 5,020,092 | 5/1991 | Phillips et al. . | |
| 5,020,093 | 5/1991 | Pireh . | |
| 5,077,790 | 12/1991 | D'Amico et al. ......................... 380/23 |
| 5,128,959 | 7/1992 | Bruckert ..................................... 375/1 |
| 5,146,498 | 9/1992 | Smith ....................................... 380/21 |
| 5,159,625 | 10/1992 | Zicker ...................................... 379/59 |
| 5,216,703 | 6/1993 | Roy ......................................... 379/59 |
| 5,252,964 | 10/1993 | Tan et al. ........................... 340/825.48 |
| 5,301,232 | 4/1994 | Mulford .................................... 380/21 |
| 5,313,489 | 5/1994 | Menich et al. ........................... 370/332 |
| 5,335,355 | 8/1994 | Tanaka et al. . | |
| 5,343,494 | 8/1994 | Averst et al. ............................... 375/1 |
| 5,345,467 | 9/1994 | Lomp et al. ............................. 370/331 |
| 5,381,138 | 1/1995 | Stair et al. .......................... 340/825.44 |
| 5,422,931 | 6/1995 | Austin-Lazarus et al. ............. 455/553 |
| 5,425,077 | 6/1995 | Tsoi ......................................... 379/58 |
| 5,442,806 | 8/1995 | Barber et al. . | |
| 5,459,774 | 10/1995 | Breeden ................................... 379/58 |
| 5,504,803 | 4/1996 | Yamada et al. ......................... 455/542 |
| 5,550,893 | 8/1996 | Heidari .................................... 455/553 |
| 5,577,100 | 11/1996 | McGregor et al. ...................... 379/58 |
| 5,590,398 | 12/1996 | Matthews ............................... 455/33.1 |
| 5,754,542 | 5/1998 | Ault et al. ............................... 370/342 |
| 5,761,618 | 6/1998 | Lynch et al. ............................ 455/419 |
| 5,790,952 | 8/1998 | Seazholtz et al. ...................... 455/432 |
| 5,791,141 | 8/1998 | Zicker ..................................... 455/418 |
| 5,862,475 | 1/1999 | Zicker et al. ........................... 455/419 |

OTHER PUBLICATIONS

"Vertical Service Code Assignment Guidelines", Doc. No. INC 96–0802–015, Industry Carriers Compatibility Forum (ICCF), Revised Aug. 2, 1996.

"Network Initiated OTASP" by Seymon (Simon) Misikovsky, Dec. 4, 1996, Lucent Technologies.

"Over–The–Air Parameter Administration Stage 1 Description V1.03" by Steve Thomas, Feb. 27, 1997, Telecommunications Industry Association.

*Primary Examiner*—Curtis A. Kuntz
*Assistant Examiner*—Binh K. Tieu
*Attorney, Agent, or Firm*—Brown, Martin, Haller & McClain

[57] ABSTRACT

The procedure for Programmable System Determination (PSD) utilizes the over-the-air programming protocol and procedures which support the Over-The-Air Service Provisioning (OTASP) feature in accordance with established industry standards (TIA/EIA/IS-683). Using the OTASP procedure, the re-scan timer and digital acquisition timer of a mobile station are programmable by the network carrier as Number Assignment Modules (NAMs) within the mobile station. OTASP Data Messages permit the NAM values to be programmed without requiring intervention by a third party. In the OTASP procedure, programming occurs while the mobile station and base station are in the Conversation Substate using designated OTASP Data Messages. Certain OTASP Data Messages are specified according to the standard as providing a pre-determined procedure, while others are set aside for manufacturer-specific information. The OTASP Data Messages include fields for identifying the parameters to be changed: either the re-scan or the digital acquisition timer, along with the value to which the timers are to be changed.

33 Claims, 3 Drawing Sheets

PROGRAMMABLE SYSTEM DETERMINATION IN DUAL-MODE WIRELESS COMMUNICATIONS SYSTEMS

FIELD OF THE INVENTION

This invention relates to dual-mode wireless communications systems, and more specifically to communications systems with network-programmable system preferences for specifying system selection parameters for use by a mobile station.

BACKGROUND OF THE INVENTION

Widespread standardization of analog cellular communications frequencies and parameters, such as provided in North America by Telecommunications Industry Association/Electronics Industry Association Interim Standard 91 (TIA/EIA IS-91), *Mobile Station-Base Station Compatibility Standard for 800 MHZ Analog Cellular*, for the Advanced Mobile Telephone System (AMPS), permits the gradual introduction of digital transmission equipment into selected areas without wholesale replacement of the first-generation analog system. The ultimate goal is to substitute the superior signal quality offered by the second- and later generation digital systems for the entire analog system. However, this changeover is expected to occur over a period of several years and, in the meantime, digital transmissions will not be available in all areas, requiring continued use of the analog system. Channels in a given geographical area may be assigned to either digital or analog, while in other areas, the two signals may share channels. The North American Time Division Multiple Access (TDMA) standards, TIA/EIA IS-54 (*Cellular System Dual-Mode Mobile Station-Base Station Compatibility Standard*)IS-136 (*TDMA Cellular/PCS Radio Interface—Mobile Station— Base Station Compatibility—Digital Control Channel*), enhance, rather than replace, the analog cellular technology, making dual-mode operation possible. This is also the case according to the Global System for Mobile communication standard, TIA/EIA IS-129 (*Interworking/Interoperability Between DCS 1900 and IS-41 Based Maps for 1800 MHZ Personal Communications Systems*). For Code Division Multiple Access (CDMA), as defined in TIA/EIA IS-95 (*Mobile Station—Base Station Compatibility Standard for Dual-Mode Wideband Spread Spectrum Cellular System*), although the broad spectrum can be shared, certain analog frequency channels must be devoted to the CDMA system, which provides an overall improvement in spectral efficiency.

In order to take advantage of digital systems, when available, while still assuring network coverage in areas on the fringes or outside of the digital coverage areas, dual-mode mobile stations and wireless networks are becoming increasingly common. In a dual-mode environment, a mobile station (MS) may at any given time obtain service from either a digital or an analog system, depending on a number of different conditions, including geographical location relative to a base station (BS), roaming status, and scan period.

When a mobile station is initialized, a system acquisition process occurs. The IS-95 standard requires that the MS choose the frequency band to use, A or B band, and the modulation to use, analog or CDMA system. The frequency band options can be chosen independently of the modulation options. Generally, the preferences are programmed into the memory of the MS when service is activated. Some typical preferences, as defined by the IS-95 standard, are (1) System A only; (2) System B only; (3) System A preferred (if No Service can choose System B); (4) System B preferred (if No Service can choose System A); (5) CDMA only; (6) Analog only; (7) CDMA preferred (if No Service can choose Analog operation); and (8) Analog preferred (if No Service can choose CDMA). Certain MS manufacturers provide programmable system selection capability in the MSs, however, this system selection is volatile and, after a power cycle, the selection will revert to its default selection.

During system acquisition the MS attempts to receive the signal transmitted by a base station providing service coverage to the geographic area where the MS is located. Without specified preferences, the MS will select whichever of the analog or digital signals is stronger. The MS may be able to receive either the analog or digital signal equally well, however, due to the increased capacity of digital systems, where both and analog and digital service are available, network service operators typically prefer that the MS will acquire and use the digital system. The system determination process can be programmed with this preference to maximize the number of users on the preferred network.

When digital service is available, the dual-mode MS would normally start a call on a digital channel. The analog channels are then reserved for analog-only MSs. A disadvantage with this preference is the potentially longer acquisition time required for digital systems, particularly with CDMA systems. Until acquisition occurs, the user of the MS cannot place his or her call. Thus, the interest of the user in having quick access to the system competes with the interest the carrier has in shifting the network loading from the analog system to the digital system.

Another problem occurs when the MS is being operated in fringe areas of coverage of one of the systems. As the MS moves out of the coverage area of the currently-selected system it must acquire the other system (usually the analog system), whether the user is attempting to place a call and is already involved in a call. When the MS moves back into the coverage area it may reacquire the original system if it is programmed as the preferred system. During attempts to acquire or reacquire the preferred system, new calls cannot be made or received, consequently, in a boundary area, the phone may be unusable at any given time.

In addition to the MS being programmed with preferences on service acquisition, the MS is also programmed with predetermined time intervals for attempting to obtain service, i.e., a "re-scan timer". After attempting to acquire service from one system for the specified time period the MS will attempt to acquire service from the other system. There is no standard to allow individual network service carriers to specify a re-scan timer for setting the duration of the attempted digital channel acquisition before going back to the analog system. Because dual-mode digital deployment occurs in many different markets and terrains, it is unlikely that one re-scan timer would be suitable for all service providers. It is also undesirable for MSs to repeatedly leave the analog idle state to attempt to re-acquire if there is no digital coverage available since, during re-scan, the MS is unable to receive calls on the analog system. The desired frequency of re-scan will, thus, be different for different providers and MS users based upon different criteria. For example, some network providers will be more concerned with call probability and/or quality, while others may have capacity constraints within the analog system which encourage them to move MSs off of the analog channel.

There are many factors which will effect the optimum selection of parameters for system determination. The balancing of factors may vary from carrier to carrier, and may be different for categories of users based on their amount of usage, areas traveled, and type of service plan purchased. With so many variables, the application of a single system determination algorithm cannot be used to optimize system utilization and service quality for all users. Further, since the variables and their respective levels of importance are likely to change with time, limiting the setting of the system preferences to the MS activation procedure will result in MSs becoming outdated when the changes are made. Accordingly, a need remains for determining preferences for system determination which can be personalized for individual network subscribers and can be adapted to fit the network's requirements, which may change with time, and which can still be readily implemented.

BRIEF SUMMARY OF THE INVENTION

It is an advantage of the present invention to provide a system by which a network provider can dynamically update a mobile station's re-scan timer and digital acquisition timer to adapt to changes in relative situations of the network and the mobile station.

It is another advantage of the present invention to dynamically update a mobile station's re-scan timer and digital acquisition timer using over-the-air service provisioning (OTASP) features.

In an exemplary embodiment of the present invention, the procedure for Programmable System Determination (PSD) utilizes the over-the-air programming protocol and procedures which support the Over-The-Air Service Provisioning (OTASP) feature in accordance with established industry standards (TIA/EIA/IS-683). Using the OTASP procedure, the re-scan timer and digital acquisition timer of a mobile station are programmable by the network carrier as Number Assignment Modules (NAMs) within the mobile station. OTASP Data Messages permit the NAM values to be programmed without requiring intervention by a third party.

In the OTASP procedure, programming occurs while the mobile station and base station are in the Conversation Substate using designated OTASP Data Messages. Certain OTASP Data Messages are specified according to the standard as providing a pre-determined procedure, while others are set aside for manufacturer-specific information. The re-scan timer and digital acquisition timer values may be specified within the field of one or more of the manufacturer-specific information messages specifically dealing with timer value programming, or may be included within a Configuration Request Message as pre-determined parameter blocks. In either message field, if the mobile station supports dual mode operation and the programmable NAM indicators for changing timer values, the mobile station stores the message data within its temporary memory and sends a Response Message to the base station to indicate acceptance.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to like parts, and in which.

DETAILED DESCRIPTION OF A PREFERRED EMBODIMENT

The following detailed description utilizes a number of acronyms which are generally well known in the art. While definitions are typically provided with the first instance of each acronym, for convenience, Table 1 provides a list of the acronyms and abbreviations used herein along with their respective definitions.

TABLE 1

| ACRONYM | DEFINITION |
| --- | --- |
| A-Key | Authentication Key |
| ANSI | American National Standards Institute |
| BS | Base Station |
| CDMA | Code Division Multiple Access |
| EIA | Electronics Industries Association |
| IS | Interim Standard |
| MS | Mobile Station |
| NAM | Number Assignment Modules |
| OTASP | Over-The-Air Service Provisioning |
| PSD | Programmable System Determination |
| RAM | Random Access Memory |
| SSD | Shared Secret Data |
| TIA | Telecommunications Industry Association |

It should be noted the font variations within the specification and claims, particularly italicized text and text in all capital letters, reflect the formats established according to the various standards which are applicable to wireless communications, e.g., IS-95 and IS-683.

Figure 1:
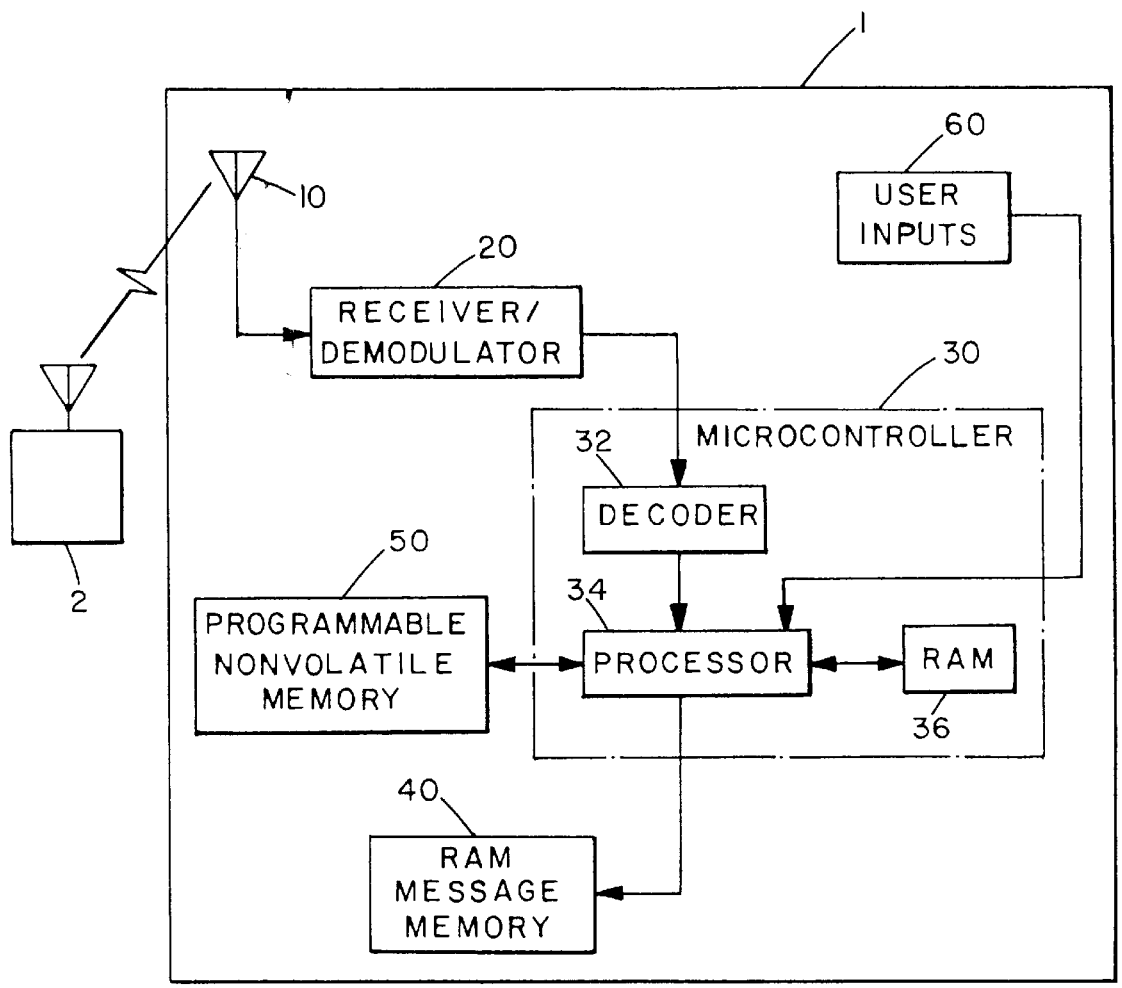
FIG. 1 is a block diagram of an exemplary mobile phone receiver and base station.

Referring to FIG. 1, a conventional mobile phone receiver, which is generally designated by reference numeral 1, typically comprises an antenna 10 for receiving call signals from base station 2. The received signals are provided to a receiver and a demodulator circuit 20 and the resulting digital signal is fed to a microcontroller 30. Microcontroller 30 comprises a decoder 32, a processor 34, and an internal RAM 36. The digital signal is decoded by the decoder 32 and processed by processor 34, which reads from or writes to internal RAM 36. Memory storage for the mobile phone parameters is provided by RAM 40. The user can enter data into processor 34 via user input circuitry 60.

A non-volatile memory 50 is coupled to processor 34 for storage of information necessary for the operation of mobile phone receiver 1. The memory can be an electrically erasable programmable read only memory (EEPROM), a battery backed up memory device, or a similar memory device which retains information even when power is not applied to the mobile phone. Processor 34 accesses information such as options for various features from non-volatile memory 50 during operation, and can alter information in the memory 50 by reprogramming in accordance with the present invention.

Over-the-air service provisioning (OTASP) for activation of mobile phones, both cellular and PCS, which allows a network service provider to activate new service without intervention of a third party, such as an authorized dealer, is well known, with established standards provided in Telecommunications Industry Association/Electronics Industries Association Interim Standard 683 (TIA/EIA/IS-683) (*Over-The Air Service Provisioning of Mobile Stations in Wideband Spread Spectrum Systems*).

OTASP enables the service provider to activate a potential subscriber's (mobile user's) mobile phone by downloading the required parameters, e.g., a phone number, over the air to the mobile unit. OTASP also provides the ability to securely load an authentication key ("A-Key") into the mobile unit to allow validation and confirmation of the identity of the mobile unit to enhance security and reduce the potential for fraudulent use of the network service.

Stored within the non-volatile memory 50 of mobile station 1 is the programming for a service options for programmable Number Assignment Modules (NAM) parameters. At the time of activation, in addition to the phone number and security code, the programmable NAM values are downloaded into the memory of the mobile unit from the base station 2. The NAMs specify parameters which control wireless network usage, such as preferred mode of operation (analog or digital), shared secret data (SSD), and roaming information, or "Preferred Roaming List". Lists of numeric indicators are provided in Appendix F.3 of each of the TIA/EIA/IS-95 and ANSI J-STD-008 standards and are incorporated herein by reference. According to the present invention, the NAM parameters also include the re-scan and digital acquisition timer values. The re-scan timer is used to determine the frequency of, or period between, attempts to acquire a preferred system. In most situations, but not all, the preferred system is digital, and the re-scanning will occur while the mobile station is operating on the analog system. The digital acquisition timer determines the length of time that is allowed for attempting to acquire the digital system before determining that no digital service is available. This timer will be in effect when the mobile station is first turned on, limiting the amount of time allowed for an attempt to acquire the digital system, and during any re-scans that are made while operating on the analog system in an attempts to acquire the digital system. It should be noted that the values selected for the re-scan and digital acquisition timers may vary for different roaming sequences.

The following detailed description specifically refers to a CDMA network, however, it will be apparent to those skilled in the art that by substituting the corresponding protocol and processes for analog networks according to the IS-683 standard, the inventive parameter administration method may be similarly implemented in an analog network.

In the PSD method of the present invention, in accordance with OTASP procedures, the mobile station 1 and base station 2 are required to be in the Conversation Substate (or in the analog Conversation Task) in order to proceed with over-the-air provisioning. Entry of the Conversation Substate requires initiation by the mobile station user. According to the IS-683 standard, if MS 1 enters any other substate or task, the procedure is terminated. Thus, under the current standard, the mobile user must request the downloading of updated NAM parameters, including the system determination timer values. It may be desirable, however, to allow the network to update the timer values for system determination without being requested to do so by the user. In that case, an unlock code would be included in, for example, a Page Message sent by the base station which, if it matches a corresponding code in the mobile station, would direct the mobile station to proceed to a Traffic Channel over which the new timer values could be downloaded to the mobile station without requiring user intervention.

OTASP Data Messages are used to communicate between BS 2 and MS 1 during the OTASP procedure. Certain OTASP Data Messages are set aside for manufacturer-specific information. Such messages are designated as OTASP_MSG_TYPE (11000000) through (11111110). The re-scan timer and digital acquisition timer values may be specified in this field. Alternatively, the values may be included within parameter blocks included in a Configuration Request Message (OTASP_MSG_TYPE (00000000).

When using OTASP Data Messages set aside for manufacturer-specific information, two message types may be designated for programming the timer values. The first such message, e.g., the Re-scan Timer Download Request Message, could be designated as OTASP_MSG_TYPE (11000001). This Message, which is sent by the BS to the MS, includes a BLOCK_ID field for identifying the parameter, in this case, the NAM value corresponding to the re-scan time period, as well as the PARAM_DATA field, which includes the actual value to be downloaded. If the MS supports re-scan timer programming, it will acknowledge such support by responding to the BS by sending a Download Response Message with the same BLOCK_ID field and PARAM_DATA field.

The second message, e.g., the Digital Acquisition Timer Download Message, could be designated as OTASP_MSG_TYPE (11000010). This Message also includes a BLOCK_ID field and the PARAM_DATA field corresponding to the digital acquisition time period. The MS will also acknowledge support and receipt using a Download Response Message. It should be noted that the above message designations and the OTASP_MSG_TYPE fields are selected only for illustration and are not intended to imply that such designations are specified in any relevant standard.

If a Configuration Request Message (OTASP_MSG_TYPE (00000000)) it will, as in the previous examples, include a parameter block identifier (BLOCK_ID) which indicates to the MS which parameters, in this case, the timer values, are to be changed. Within a Configuration Request Message are a number of different parameter block types, including parameter block definitions which are available for manufacturer-specific parameters. The BLOCK_ID is allotted 8 bits within the Message. The BLOCK_ID fields that are available for manufacturer-specific parameters are (10000000) through (11111111). The first parameter block, e.g., the Re-scan Timer Data, could be designated as BLOCK_ID (10000001). This parameter block, which, based on the assigned field, already identifies the parameter to be downloaded, would simply include the actual value to be downloaded. If the MS supports re-scan timer programming, it will acknowledge such support by responding to the BS by sending a Configuration Response Message with the same BLOCK_ID field.

The second parameter block, e.g., the Digital Acquisition Timer Data, could be designated as BLOCK_ID (10000010). As above, this parameter block already identifies the parameter to be downloaded, and thus, simply includes the actual value to be downloaded. If the MS supports digital acquisition timer programming, it will acknowledge such support by responding to the BS by sending a Configuration Response Message with the same BLOCK_ID field.

Figure 2:
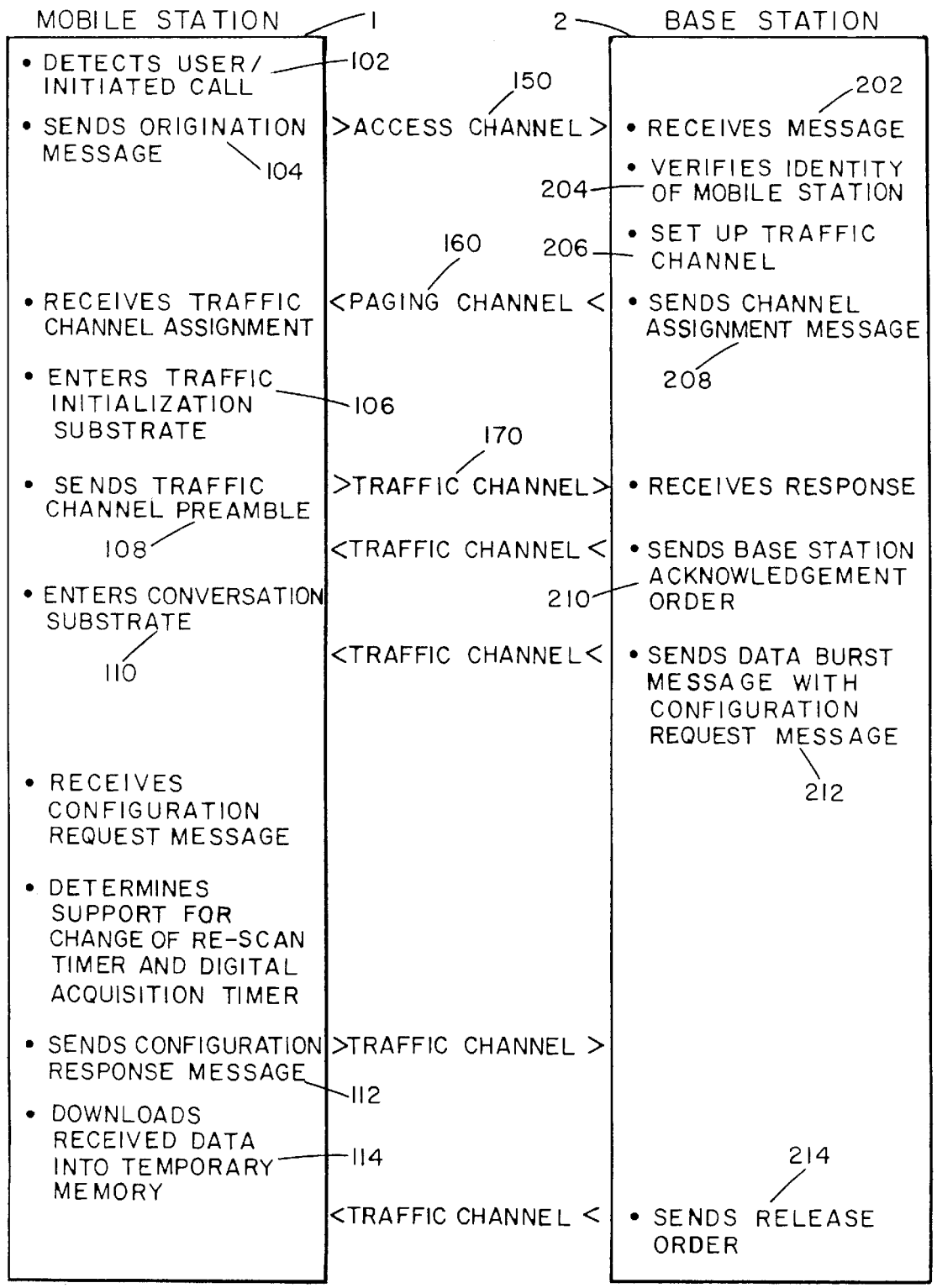
FIG. 2 is a diagram of an exemplary OTASP call flow for programming the re-scan and digital acquisition timers according to one embodiment of the invention.

FIG. 2 provides an exemplary flow diagram for downloading new re-scan and digital acquisition timers into the memory of the mobile station. The following assumptions apply:

1) Both the Mobile Station and Base Station are configured for dual-mode operation;
2) The Mobile Station supports the procedure for updating system determination timers;
3) The Mobile Station has already performed the initial steps for registration in the network within which the Base Station belongs, including updating overhead information.

Mobile Station 1 detects a user initiated call 102 to request updating of the system determination timers, which may be selected using a Menu function already programmed in memory in MS 1. MS 1 sends an Origination Message 104 over Access Channel 150 to BS 2. Included in Origination Message 104 is the indication that system determination timer updating is requested. Base Station 2 receives the message (step 202), verifies the identity of the mobile station (step 204), sets up the Traffic Channel 170 (step 206) and responds with a Channel Assignment Message 208 on the Paging Channel 160. MS 1 receives the message and enters the Traffic Channel Initialization Substate (step 106), then responds by sending the Traffic Channel preamble (step 108). BS 2 sends a Base Station Acknowledgment Order over forward Traffic Channel 170 (step 210) which causes MS 1 to enter the Conversation Substate 110. BS 2 sends a Data Burst Message which carries a Configuration Request Message 212. Included within Configuration Request Message 212 are the parameter identification and data fields for downloading new values for the re-scan timer and the digital acquisition timer. MS 1 receives the message and responds with Configuration Response Message 112, acknowledging support of the timer update function and repeating the parameter identification and data field which it received. MS 1 downloads the received data into temporary memory (step 114) and then transfers the data into non-volatile memory (step 116). The call is then released (step 214).

The other option for transmitting the timer values within manufacturer-specific OTASP Data Messages uses a similar sequence to the call flow of FIG. 2 except that the manufacturer-specific OTASP Data Message is substituted for the Configuration Request Message. Following this embodiment, a Data Burst Message would contain two OTASP Data Messages: the Re-scan Timer Download Request Message and the Digital Acquisition Timer Download Message. The MS would respond acknowledging support and receipt for both functions.

Figure 3:
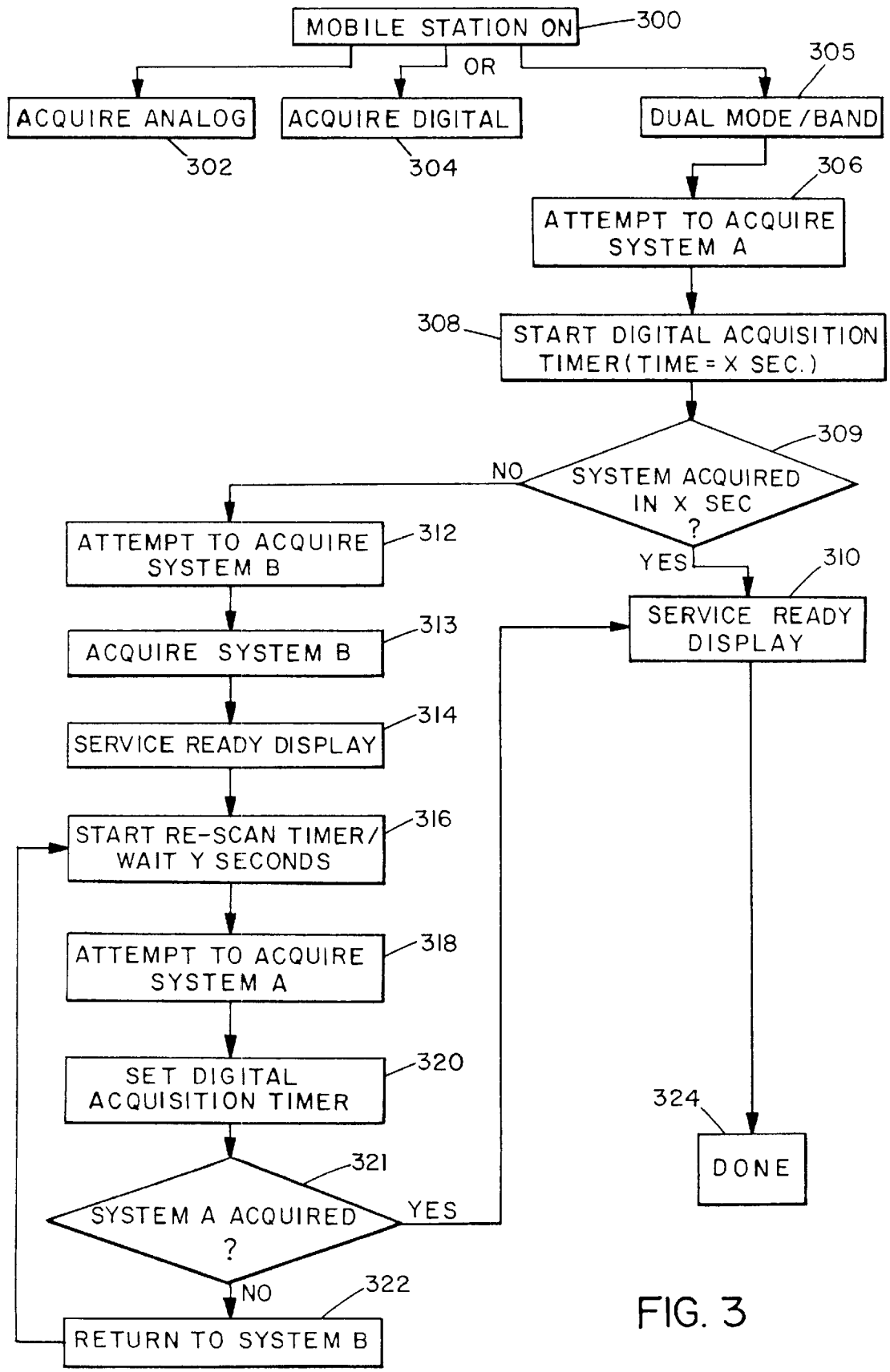
FIG. 3 is a block diagram of the network service selection sequence.

FIG. 3 illustrates the process for network service selection using a dual-mode mobile station. As is known, the mobile station 1 may be pre-programmed with designated system preferences. When MS 1 is turned on (step 300), if it is designated "analog only", the MS will proceed to analog service acquisition (step 302). If the MS is designated "digital only", it will acquire the digital system (step 304). Both steps 302 and 304 are contingent upon availability of service in the selected system. If no service is available, the MS will provide a "No Service" display.

If MS is given the option to select a system (dual mode/band—305), it will attempt to acquire System A (step 306). Assuming that the MS is set up for CDMA operation, System A will be the CDMA system. The digital acquisition timer is initiated (step 308), with the timer value X seconds being programmed using the OTASP procedure. If successful in its attempt to acquire in X seconds (step 309), the MS will provide an indication that it is "service ready" (step 310). If X seconds expire before acquisition occurs, MS will attempt to acquire System B (step 312), which, continuing the assumption, is an analog system. If successful (step 313) MS will provide an indication that it is "service ready" (step 314). Once operating on System B, the MS will initiate re-scan timer (step 316) which causes it to periodically attempt to acquire System A. The frequency of the re-scan sequence is programmed with the timer value Y seconds using the OTASP procedure. Once the re-scan step 318 is initiated, digital acquisition timer is started to limit the duration of the acquisition attempt (step 320). If the re-scan is not successful in acquiring System A in X seconds (step 321), MS will return to operation on System B (step 322) until an acquisition attempt in the digital system is successful, at which time the MS completes the procedure and enters the digital idle mode (step 324).

Other embodiments and modifications of the present invention will occur readily to those skilled in the art in view of these teachings. Therefore, this invention is to be limited only by the following claims, which include other embodiments and modifications when viewed in conjunction with the above specification and accompanying drawings.

I claim:

1. A method for updating operating parameters for acquiring one of a first system and a second system for operation of a dual-mode mobile station in a wireless communications network having a base station, the operating parameters being stored within a non-volatile memory, the method comprising:

establishing a re-scan frequency parameter included within the plurality of operating parameters, the re-scan frequency parameter having a first value for defining the frequency at which the mobile station attempts to acquire one of the first system and the second system;

establishing an acquisition duration parameter included within the plurality of operating parameters, the acquisition duration parameter having a second value for defining the duration for attempting to acquire one of the first system and the second system while the mobile station is operating in the other of the first system and the second system;

programming the mobile station with a parameter change service option for changing the first value and the second value over an air interface between the mobile station and the base station;

transmitting an origination message from the mobile station to the base station, the origination message including a request to enter an over-the-air service provisioning procedure to update at least a portion of the plurality of operating parameters including the re-scan frequency parameter and the acquisition duration parameter;

transmitting a request message from the base station to the mobile station, the request message including a first identifier for the first value and a second identifier for the second value;

receiving the request message at the mobile station;

transmitting from the mobile phone to the base station a response message including a verification of support for the parameter change service option, the first identifier, the first value, the second identifier and the second value;

storing the first value and the second value in the non-volatile memory of the mobile station; and transmitting a release message terminating the over-the-air service provisioning process.

2. The method of claim 1, wherein the request message is an Over-The-Air Service Provisioning Data Message.

3. The method of claim 2, wherein the Over-The-Air Service Provisioning Data Message is a Configuration Request Message containing at least one parameter block for manufacturer-specific parameters, and wherein the first identifier, the first value, the second identifier and the second value are all included within the at least one parameter block.

4. The method of claim 2, wherein the Over-The-Air Service Provisioning Data Message is at least one manufacturer-specific data message.

5. The method of claim 4, wherein the at least one manufacturer-specific data message comprises a first data message including the first identifier and the first value and a second data message including the second identifier and the second value.

6. The method of claim 1, wherein the over-the-air service provisioning procedure is performed according to the IS-683 standard.

7. The method of claim 1, wherein at least one of the first system and the second system is a digital system.

8. A method for programmable system determination using a dual-mode mobile station for selecting one of a first system and a second system, the method comprising:
   storing a first operating parameter within a memory within the mobile station, the first operating parameter defining a re-scan period for attempting to acquire a selected one of the first system and the second system;
   storing a second operating parameter within the memory within the mobile station, the second operating parameter defining an acquisition duration for attempting to acquire the selected one of the first system and the second system;
   providing means for programming the first operating parameter and the second operating parameter using an over-the-air service provisioning procedure wherein the base station re-programs the re-scan period and the acquisition duration within the memory of the mobile station.

9. The method of claim 8, wherein the over-the-air service provisioning procedure is initiated by the mobile station.

10. The method of claim 8, wherein the over-the-air service provisioning procedure includes a plurality of data messages, each data message comprising a field for identifying an operating parameter and a data field containing a new value for the operating parameter.

11. The method of claim 8, wherein the over-the-air service provisioning procedure is according to the IS-683 standard.

12. A wireless communications network for controlling acquisition attempts of an operating mode of at least two operating modes, the network comprising:
   a base station;
   a multi-mode mobile station comprising:
      a non-volatile memory for storing a plurality of operating parameters including a re-scan timer parameter for defining a frequency of the acquisition attempts and an acquisition timer parameter for defining a duration of the acquisition attempts;
      means for programming the plurality of operating parameters; and
      means for initiating a call from the mobile station to the base station for requesting entry into an over-the-air service provisioning process for programming the re-scan timer parameter and the acquisition timer parameter;
   means for enabling a download of updated first and second operating parameters from the base station to the mobile station; and
   means for terminating the call.

13. The network of claim 12, wherein the over-the-air service provisioning process is in accordance with the IS-683 standard.

14. A method for updating at least one system determination parameter for specifying one of a first system and a second system for operation of a dual-mode mobile station in a wireless communications network having a base station, the at least one system determination parameter being stored within a non-volatile memory, the method comprising:
   defining a data field within a plurality of operating parameters, the data field comprising a re-scan value for determining a re-scan period for attempting to acquire one of the first system and the second system;
   programming the mobile station with a parameter change service option for changing the re-scan value over an air interface between the mobile station and the base station;
   transmitting an origination message from the mobile station to the base station, the origination message including a request to enter an over-the-air service provisioning procedure to update at least a portion of the plurality of operating parameters including the re-scan value;
   transmitting a request message from the base station to the mobile station, the request message including an identifier for the data field and the re-scan value;
   receiving the request message at the mobile station;
   transmitting from the mobile phone to the base station a response message including a verification of support for the parameter change service option, the identifier and the re-scan value;
   storing the re-scan value in the non-volatile memory of the mobile station; and
   transmitting a release message terminating the over-the-air service provisioning process.

15. The method of claim 14, wherein the request message is an OTASP Data Message.

16. The method of claim 15, wherein the OTASP Data Message is a Configuration Request Message containing at least one parameter block for manufacturer-specific parameters, and wherein the identifier and the re-scan value are all included within the at least one parameter block.

17. The method of claim 15, wherein the OTASP Data Message is at least one manufacturer-specific data message.

18. The method of claim 17, wherein the at least one manufacturer-specific data message comprises a first data message including the first identifier and the first value and a second data message including the second identifier and the second value.

19. The method of claim 14, wherein the over-the-air service provisioning procedure is performed according to the IS-683 standard.

20. The method of claim 14, wherein at least one of the first system and the second system is a digital system.

21. A method for updating system determination parameters for specifying one of a first system and a second system for operation of a dual-mode mobile station in a wireless communications network having a base station, the system determination parameters being stored within a non-volatile memory, the method comprising:
   defining a data field within the plurality of operating parameters, the data field including an acquisition timer value for determining an acquisition period for attempting to acquire one of the first system and the second system while the mobile station is operating in the other of the first system and the second system;
   programming the mobile station with a parameter change service option for changing the acquisition timer value over an air interface between the mobile station and the base station;
   transmitting an origination message from the mobile station to the base station, the origination message including an request to enter an over-the-air service provisioning procedure to update at least a portion of the plurality of operating parameters including the acquisition timer value;

transmitting a request message from the base station to the mobile station, the request message including an identifier for the data field and the acquisition timer value;

receiving the request message at the mobile station;

transmitting from the mobile phone to the base station a response message including a verification of support for the parameter change service option, the identifier and the acquisition timer value;

storing the acquisition timer value in the non-volatile memory of the mobile station; and transmitting a release message terminating the over-the-air service provisioning process.

22. The method of claim 21, wherein the request message is an OTASP Data Message.

23. The method of claim 22, wherein the OTASP Data Message is a Configuration Request Message containing at least one parameter block for manufacturer-specific parameters, and wherein the identifier and the acquisition timer value included within the at least one parameter block.

24. The method of claim 22, wherein the OTASP Data Message is at least one manufacturer-specific data message.

25. The method of claim 24, wherein the at least one manufacturer-specific data message comprises a data message including the identifier and the acquisition timer value.

26. The method of claim 21, wherein the over-the-air service provisioning procedure is performed according to the IS-683 standard.

27. The method of claim 21, wherein at least one of the first system and the second system is a digital system.

28. A mobile phone having dual-mode capability for operation on one of a first system and a second system, each of the first and second systems having over-the-air service provisioning capability, the mobile phone comprising:

transmitter and receiver circuitry for receiving signals from and transmitting signals to the first system and the second system;

a programmable memory for storage of a plurality of operating parameters for the mobile phone, the plurality of operating parameters including at least one timing parameter for selecting a timing for acquisition of one of the first and second systems; and a processor for processing received signals containing a portion of the plurality of operating parameters, for activating an over-the-air service provisioning function, and for programming and updating the portion of the plurality of operating parameters in the programmable memory of the mobile station, wherein the portion of the plurality of operating parameters includes the at least one timing parameter.

29. The mobile phone as in claim 28, further comprising a user input connected to the processor for initiating and transmitting a request signal from the mobile phone to one of the first and second systems to update the at least one timing parameter.

30. The mobile phone as in claim 28, wherein the at least one timing parameter is a re-scan timer for controlling a frequency of system acquisition attempts.

31. The mobile phone as in claim 28, wherein the at least one timing parameter is a system acquisition timer for controlling a time period for system acquisition attempts.

32. The mobile phone of claim 28, wherein the over-the-air service provisioning function is performed according to the IS-683 standard.

33. A method for a mobile station to acquire a system of a multi-system communications network having at least a first system and a second system, the method comprising the steps of:

(a) programming the mobile station with a re-scan timer parameter for controlling a re-scan timer and an acquisition parameter for controlling an acquisition timer;

(b) attempting to acquire the first system;

(c) starting the acquisition timer to establish a pre-determined duration for the attempt to acquire the first system;

(d) if the attempted acquisition is not successful within the pre-determined duration, acquiring the second system, and performing a re-scan procedure comprising the steps of:

starting the re-scan timer to establish a pre-determined re-scan period between attempts to acquire the first system;

waiting for the pre-determined re-scan period;

attempting to acquire the first system;

starting the acquisition timer to establish the pre-determined duration for the attempt to acquire the first system; and if the attempted acquisition is not successful, repeating step (d);

(e) selecting the first system after a successful attempted acquisition within the pre-determined duration; and (f) indicating on the mobile station that service is ready.

* * * * *